US005798814A

United States Patent [19]

Konuma

[11] Patent Number: 5,798,814

[45] Date of Patent: Aug. 25, 1998

[54] METHOD OF DRIVING A FERROELECTRIC LIQUID CRYSTAL OPTICAL DEVICE

[75] Inventor: Toshimitsu Konuma, Kanagawa, Japan

[73] Assignee: Semiconductor Energy Laboratory Co., Ltd., Kanagawa, Japan

[21] Appl. No.: 698,221

[22] Filed: Aug. 14, 1996

Related U.S. Application Data

[63] Continuation of Ser. No. 308,969, Sep. 20, 1994, abandoned, which is a continuation of Ser. No. 87,551, Jul. 8, 1993, abandoned, which is a continuation of Ser. No. 749,677, Aug. 26, 1991, abandoned.

[30] Foreign Application Priority Data

| | | | |
|---|---|---|---|
| Aug. 28, 1990 | [JP] | Japan | 2-226103 |
| Aug. 28, 1990 | [JP] | Japan | 2-226104 |

[51] Int. Cl.$^6$ .......... G02F 1/141

[52] U.S. Cl. .......... 349/172; 349/170; 349/191; 349/161

[58] Field of Search .......... 359/56, 85, 86, 359/90, 91, 100, 900; 349/170, 161, 171, 172, 191; 345/97

[56] References Cited

U.S. PATENT DOCUMENTS

| | | | |
|---|---|---|---|
| 4,236,150 | 11/1980 | Chorn | 359/86 |
| 4,670,654 | 6/1987 | Ross | 349/170 |
| 4,715,688 | 12/1987 | Harada et al. | 359/56 |
| 4,763,992 | 8/1988 | Takada et al. | 359/86 |
| 4,793,693 | 12/1988 | Shimoda et al. | 359/56 |
| 4,867,539 | 9/1989 | Goodby et al. | 359/104 |
| 4,902,107 | 2/1990 | Tsuboyama et al. | 359/86 |
| 4,917,469 | 4/1990 | Ross | 359/86 |
| 5,005,953 | 4/1991 | Kawagishi | 359/63 |
| 5,013,137 | 5/1991 | Tsuboyama et al. | 359/100 |
| 5,124,827 | 6/1992 | Davey | 359/76 |
| 5,136,408 | 8/1992 | Okada et al. | 359/56 |
| 5,164,852 | 11/1992 | Konuma | 359/76 |
| 5,196,955 | 3/1993 | Konuma et al. | 359/100 |
| 5,227,904 | 7/1993 | Nakanowatari | 359/76 |

FOREIGN PATENT DOCUMENTS

| | | | |
|---|---|---|---|
| 61-231942 | 10/1987 | Japan | 359/56 |
| 62-299820 | 12/1987 | Japan | 359/56 |
| 1-161221 | 6/1989 | Japan | 349/170 |

*Primary Examiner*—William L. Sikes

*Assistant Examiner*—Tai V. Duong

*Attorney, Agent, or Firm*—Sixbey, Friedman, Leedom & Ferguson, P.C.; Gerald J. Ferguson, Jr.

[57] ABSTRACT

An improved method of driving liquid crystal optical devices utilizing a ferroelectric liquid crystal is described. A ferroelectric liquid crystal material disposed between a pair of substrates in the optical device has an apparent negative dielectric anisotropy at its operational temperatures, e.g. not higher than 40° C. The liquid crystal consists of a number of layers normal to the substrates. The constituent layers consist, in turn, of liquid crystal molecules parallel to the substrates. Misalignment of the molecules yields bends in the layered structure which degrades the contrast ratio. When alternating electric field is given, the molecules are subjected to an electric torque which exerts thereon in order to force the molecules parallel to the substrate by virtue of the apparent negative dielectric anisotropy so that the bends can be removed. It was found that the absolute value of the apparent negative dielectric anisotropy increased as the driving frequency increased.

3 Claims, 3 Drawing Sheets

METHOD OF DRIVING A FERROELECTRIC LIQUID CRYSTAL OPTICAL DEVICE

This application is a Continuation of Ser. No. 08/308,969, filed Sep. 20, 1994, now abandoned; which itself is a continuation of Ser. No. 08/087,551, filed Jul. 8, 1993, now abandoned, which is a continuation of Ser. No. 07/749,677, filed Aug. 26, 1991, now abandoned.

BACKGROUND OF THE INVENTION

1. Field of the Invention

The present invention relates to a method of driving liquid crystal devices. More particularly, it relates to such a method of driving liquid crystal optical devices wherein formation of undesirable bends are unlikely in liquid crystal layered structure.

2. Description of the Prior Art

As compared with twisted liquid crystal displays broadly used hitherto, ferroelectric liquid crystal displays have many attractive advantages such as quick response and wide view angles. In such a liquid crystal display, a ferroelectric liquid crystal material is disposed between a pair of substrates in the form of a layered structure consisting of a number of liquid crystal layers. The layers of the liquid crystal are arranged in parallel to each other and normal to the substrate, and have a tendency of being bent between the substrates as illustrated in FIG. 1. The bends appear as undesirable optical defects in controlled molecular orientation at the positions 11 where the directions of bend are changed, resulting in reduction of contrast of images. These defects come out, when viewed from the substrate, as zigzags which can not regulate transmission of light incident thereupon. It is very difficult to remove such bends from the layered structure and the bends continue to degrade the contrast during its operation.

In order to reform the layered structure, the pretilt angle between the inside contiguous surface of the substrate and e directors (long axes) of the liquid crystal molecules has to be decreased as small as possible so that the molecules 13 become in parallel to the inside surface. The pretilt angles, however, are determined mainly by the combination of the liquid crystal material and the orientation control surface contiguous thereto. No practicable technique has been established yet to dispose a ferroelectric liquid crystal material between a pair of substrates with liquid crystal molecules correctly aligned in parallel to the contiguous surfaces of the substrates. On the other hand, ferroelectric liquid crystal materials exhibit phase transition in accordance with temperature change. The pretilt angle varies in accordance with temperature change.

BRIEF SUMMARY OF THE INVENTION

It is an object of the present invention to provide an improved method of driving liquid crystal optical devices utilizing a ferroelectric liquid crystal material.

It is another object of the present invention to provide an improved method of driving liquid crystal optical devices having a ferroelectric liquid crystal material to form clear images.

It is a further object of the present invention to provide an improved method of driving liquid crystal optical devices having a ferroelectric liquid crystal material in order not to form bends in its layered structure.

It is a still further object of the present invention to provide an improved method of driving liquid crystal optical devices having a ferroelectric liquid crystal material to exhibit excellent memory characteristics.

It is a still further object of the present invention to provide an improved method of driving liquid crystal optical devices having a ferroelectric liquid crystal material to form clear visions at high contrast.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, the ferroelectric liquid crystal material disposed between a pair of substrates in the device has an apparent negative dielectric anisotropy at temperatures, e.g. not higher than 40° C., typically between 0° C. and 40° C. Preferably, the ferroelectric liquid crystal material has an apparent negative dielectric anisotropy at any temperature from 0° C. to 40° C. The apparent dielectric anisotropy is defined as $\Delta\epsilon=\epsilon_n-\epsilon_p$ where $\epsilon_n$ is a relative dielectric constant calculated from the equation $C_n=\epsilon_0\epsilon_n D/d$ and $\epsilon_p$ is a relative dielectric constant calculated from the equation $C_p=\epsilon_0\epsilon_p S/d$: d being a distance between the substrates; S being an area of one of surfaces of the substrates; $\epsilon_0$ being a dielectric constant in vacuum; $C_n$ being capacitance of a capacitor comprising the pair of substrates and ferroelectric liquid crystal molecules provided between the substrates and aligned in a direction perpendicular to the substrates; and $C_p$ being capacitance of a capacitor comprising the pair of substrates and the ferroelectric liquid crystal molecules provided between the substrates and aligned in a direction parallel to the substrates. It is preferred that the absolute value of the apparent negative dielectric anisotropy is large, as explained infra. The temperature dependence of $\epsilon_n$ and $\epsilon_p$ of a ferroelectric liquid crystal material is shown in FIG. 2. Numeral 15 designates $\epsilon_p$. In experiments of FIG. 2, $\epsilon_p$ was substantially independent of frequency. Numerals 16, 17, 18 and 19 designate $\epsilon_n$ when the frequencies of the driving signals were 20 KHz, 30 KHz, 40 KHz and 60 KHz respectively. In FIG. 2, an absolute value of apparent negative dielectric anisotropy is 0.2 at 40° C. at a frequency of 30 KHz and is 0.32 at 40° C. at a frequency of 40 KHz. The measurement of $\epsilon_p$ and $\epsilon_n$ was carried out by disposing the liquid crystal material between pairs of substrates provided with electrodes in order that the liquid crystal molecules are aligned respectively in parallel and normal to the substrates. The transition of the liquid crystal was observed as Iso←(71.7° C.)→SmA←(46.3° C.)→chiral SmC←(−9.7° C.)→Crystal. The spontaneous polarization was measured to be −17.7 nC/cm$^2$ at 25° C. The tilt angle was measured to be 15° at 25° C. $\epsilon_p$ abruptly increased near the phase transition temperature between Iso and SmA.

As seen from FIG. 2, $\epsilon_n$ decreased as the frequency increased. The decrease of $\epsilon_n$ means decrease of $\Delta\epsilon$. The driving signals applied to the liquid crystal are a train of pulses, for example. Namely, it is found that $\Delta\epsilon$ can be decreased, i.e. the absolute value of the negative $\Delta\epsilon$ can be increased by increasing the frequency, i.e. by decreasing the pulse width. As seen from FIG. 2, large absolute values of apparent negative dielectric anisotropies not smaller than 0.2 can be utilized at temperatures not higher than 40° C. in case of frequencies not lower than 30 KHz. In case of ferroelectric liquid crystal provided between a pair of substrates different from the ferroelectric liquid crystal of FIG. 2, an absolute value of apparent negative dielectric anisotropy is 0.2 at 40° C. at a specific frequency other than 30 KHz, for example a frequency lower than 30 KHz. Therefore, large absolute values of apparent negative dielectric anisotropies not smaller than 0.2 are obtained at any temperature not higher than 40° C. at any frequency not lower than such a specific frequency of, for example lower than 30 KHz. Typically, the absolute value of the apparent negative dielectric anisotropy is selected no smaller than 0.2, e.g. no smaller than 0.32. Typically, the frequency is selected no lower than 30 KHz, e.g. no lower than 40 KHz. Typically, the pulse width is selected no wider than 100/3 microseconds, e.g. no wider than 25 microseconds.

The liquid crystal consists of a number of layers normal to the substrates. The constituent layer in turn consists of liquid crystal molecules arranged parallel to the substrates. Misalignment of the molecules yields bends in the layered structure as illustrated in FIG. 1. The molecular motion of the liquid crystal is provoked by the product (Ps·E) of the spontaneous polarization Ps and the applied electric field E and the product ($\Delta\epsilon E^2$) of the apparent dielectric anisotropy and the electric field. When given alternating electric fields, e.g. as driving signals, the molecules are subjected to an electric torque which exerts thereon in order to make the molecules parallel to the substrate by virtue of the apparent negative dielectric anisotropy as illustrated in FIG. 3. The magnitude of the torque is proportional to $\Delta\epsilon^2$. Therefore, a larger torque can be applied to the liquid crystal in order to force the liquid crystal molecules in parallel to the substrates by a larger absolute value of apparent negative dielectric anisotropy. The torque is exerted to erect the molecules in the case of apparent positive dielectric anisotropies. The theory of these actions is explained in Xue Jiu-zhi, et al.; Ferroelectronics, 73, p. 305(1987).

Accordingly, a larger torque proportional to the electric field can be applied to the liquid crystal in order to force the liquid crystal molecules in parallel to the substrates by increasing the frequency of or decreasing the pulse width of the driving signals.

In accordance with an aspect of the present invention, a liquid crystal optical device comprising a ferroelectric liquid crystal is driven by applying an alternating electric signal to ferroelectric liquid crystal molecules constituting said ferroelectric liquid crystal at a high frequency in order to drive said ferroelectric liquid crystal at a large absolute value of apparent negative dielectric anisotropy wherein said absolute value is dependent on said high frequency and a temperature of said ferroelectric liquid crystal since the magnitude of the torque exerted to make the molecules parallel to the substrate becomes large as the absolute value of apparent negative dielectric anisotropy becomes large. For example, a liquid crystal optical device comprising a ferroelectric liquid crystal may be driven by applying an alternating electric signal to ferroelectric liquid crystal molecules constituting said ferroelectric liquid crystal at a high frequency in order to drive said ferroelectric liquid crystal at a large absolute value of apparent negative dielectric anisotropy as a function of said high frequency and a temperature of said ferroelectric liquid crystal. The high frequency may be a fixed frequency not lower than 30 kHz, preferably not lower than 40 kHz.

FIG. 4 is a graphical diagram showing the contrast being improved as the frequency increases. The measured contrast ratios are plotted by circles (line 20) in the diagram. Squares indicate optimum voltage amplitudes of driving signals suitable for obtaining highest contrasts (line 21). Driving thresholds are determined as the product (Vt) of the applied voltage V and the time during which the voltage is applied. If Vt equals, equivalent images can be displayed. For this reason, the voltage is increased as the frequency is increased in the diagram.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
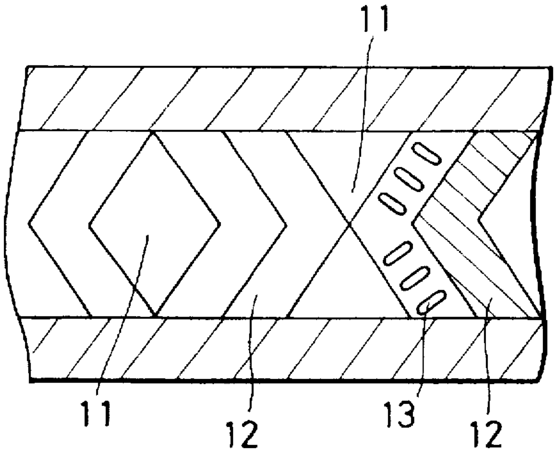
FIG.1 PRIOR ART
FIG. 1 is a schematic diagram showing undesirable bends of liquid crystal layers in a prior art liquid crystal display.
Figure 2:
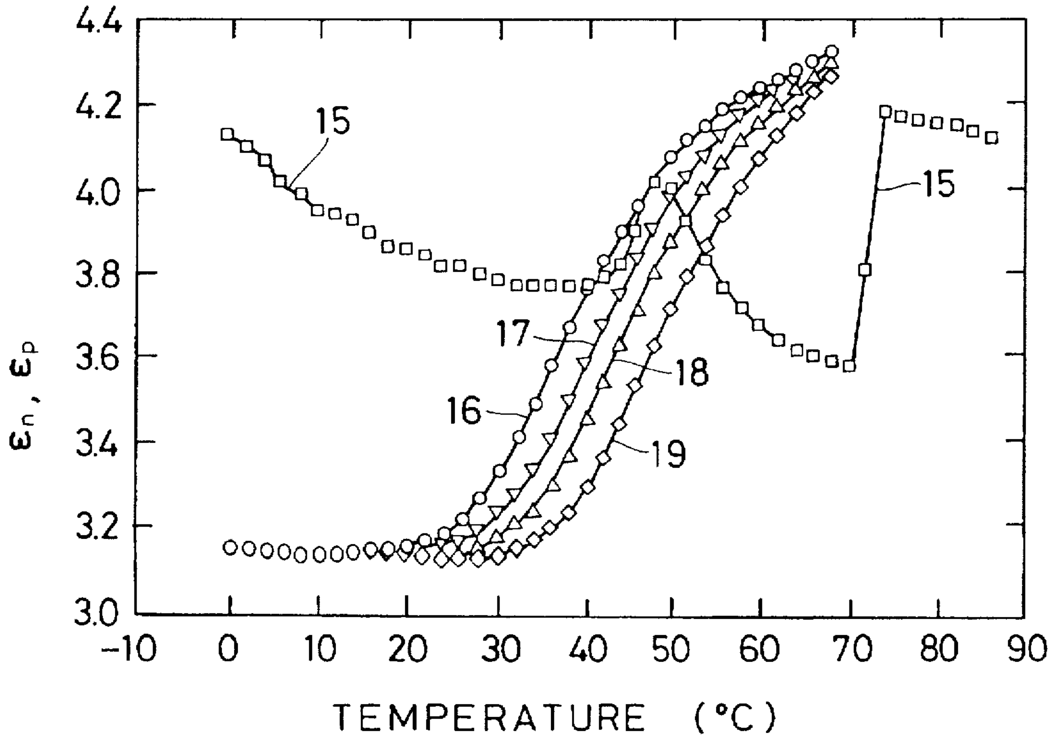
FIG. 2 is a graphical diagram showing relative dielectric constants vensus temperature.
Figure 3:
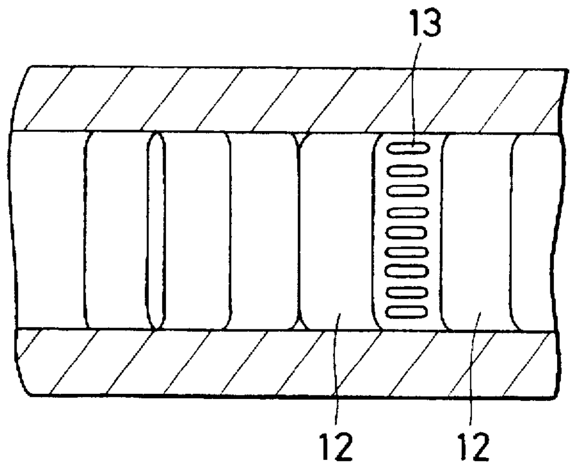
FIG. 3 is an explanatory view showing liquid crystal layers en a liquid crystal display is driven in accordance with the present invention.
Figure 4:
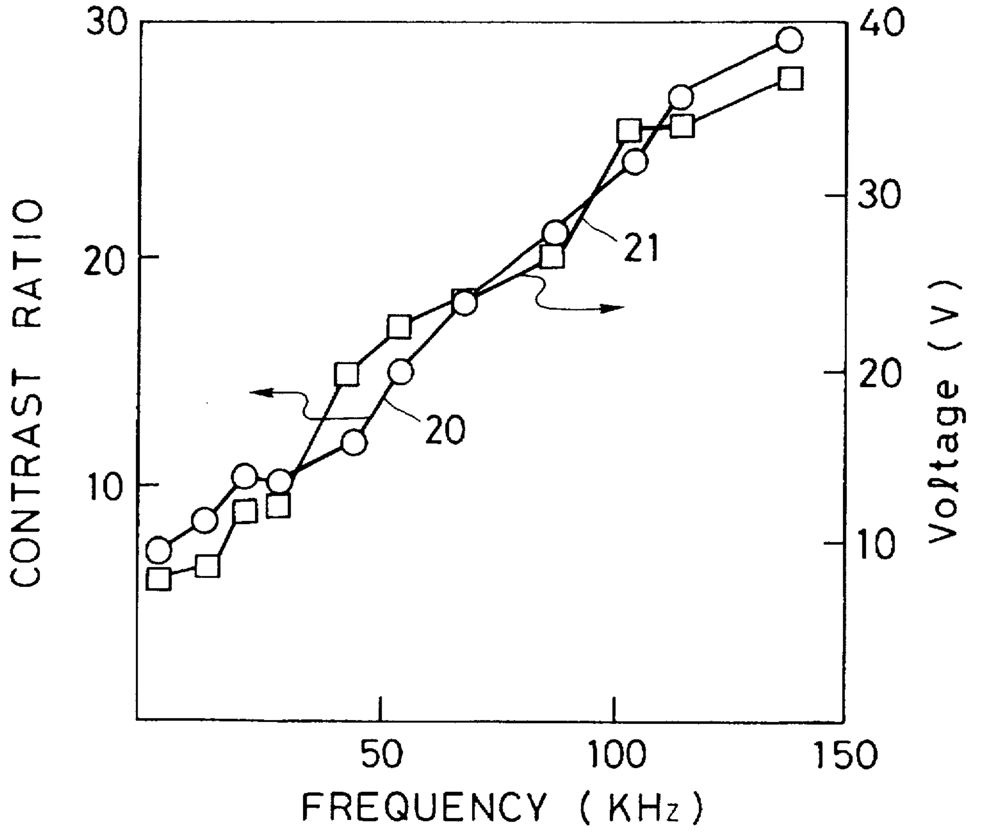
FIG. 4 is a graphical diagram showing the contrast and the voltage versus the frequency at which a liquid crystal display is driven.
Figure 5:
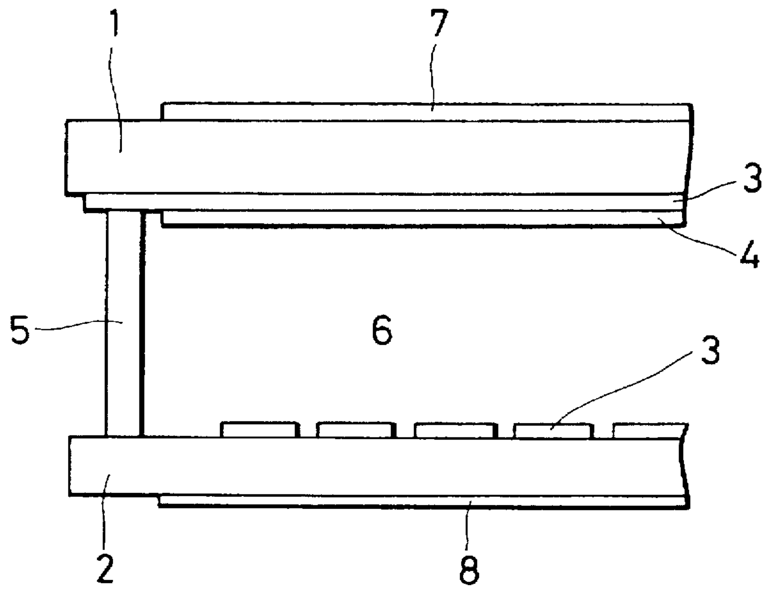
FIG. 5 is a partial cross sectional view showing a liquid crystal display which is driven in accordance with the present invention.

Referring now to FIG. 5, a liquid crystal display utilizing a ferroelectric liquid crystal which is driven in accordance with a preferred embodiment of the present invention will be explained.

The display comprises a pair of substrates 1 and 2 made of a transparent sodalime glass plate. ITO films of 1200 Å thickness are deposited by DC magnetron sputtering on the inside surfaces of these substrates 1 and 2 and patterned by a known photolithography in order to form transparent conductive patterns 3 which are adapted to induce an electric field therebetween required for driving the display. The conductive patterns are provided in the form of an electrode arrangement, e.g. diagonal sets of parallel strips, in order to define a plurality of pixels in a matrix form. The inside surface of the substrate 1 is then coated with an orientation control film, e.g. a polyimide thin film 4 of 150 Å by applying over the electrode arrangement an N-methyl-2-pyrrolidone solution of polyamic acid by offset printing and heating the thin film at 250° C. for 3 hours. Suitable rubbing treatment is given to the polyimide film 4 by means of a cotton cloth applied to a roller in order to form an orientation control surface. Spacers consisting of hard particles of 2 μm diameter are applied to the inside surface of the substrate 2. The peripheral inside of the substrate 1 is provided with a sealing member 5 made of an epoxy-based thermosetting adhesive by screen printing. The pair of these substrates 1 and 2 are joined with the adhesive therebetween and heated under pressure in order to harden the adhesive. A ferroelectric liquid crystal is disposed between the substrates 1 and 2 through an opening provided in the sealing member 5, which is closed thereafter by means of a UV-light setting resin. Finally, a pair of polarizing plates 7 and 8 are placed on the opposite outside surfaces of the substrates.

The apparent dielectric anisotropy of the liquid crystal material was measured by utilizing a horizontally oriented cell (device) and a vertically oriented cell (device). The orientation control surface for the horizontally oriented cell is formed by giving rubbing treatment to a polyimide or polyvinylalcohole film so that the liquid crystal molecules are aligned in parallel to the substrate plane. In this measurement, the thickness of the horizontally oriented cell is from 10 to 50 μm in order to reduce influence of interface. The orientation control surface for the vertically oriented cell is formed by utilizing a chromium complex or lecithin film so that the liquid crystal molecules are aligned normal to the substrate plane. The apparent dielectric anisotropy $\Delta\epsilon$ is $\epsilon_n - \epsilon_p$ as explained in SUMMARY OF THE INVENTION, where $\epsilon_n$ is calculated from the equation $C_n = \epsilon_0 \epsilon_n S/d$ and $\epsilon_p$ is calculated from the equation $C_p = \epsilon_0 \epsilon_p S/d$. The $C_n$ and $C_p$ were measured by a measuring device $HP4192_A$ produced by Hewlett-Packard Company at an oscillator voltage of 1 V at a bias voltage of 15 V. In accordance with experiments, the apparent dielectric anisotropy of the liquid crystal was measured to be −0.8 (10° C.) and −0.03 (40° C.) and the coefficient of viscosity thereof was 4950 cps (10° C.) and 1000 cps (40° C.). The contrast ratio of images viewed in the liquid crystal display was measured by supplying driving signals of 18 to 25 V thereto at 50 KHz. As a result, the contrast ratio was maintained between 18 to 21 even if the temperature was elevated from 10° C. to 40° C. so that very clear images could be observed.

The liquid crystal was replaced, for reference, by another ferroelectric liquid crystal whose apparent dielectric anisotropy was −0.6 (10° C.), 0 (approx.29° C.) and 0.4 (40° C.) with a coefficient of viscosity almost equal to that of the liquid crystal used in the above embodiment. The contrast ratio was significantly decreased to 7 to 9 at high temperatures no lower than 30° C. while maintained as high as 16 to 18 at low temperatures between 10° C. and 30° C., indicative of undesirable temperature dependence of performance. The decrease in contrast ratio was attributable to existence of zigzag type defects which were observed by a microscope.

Table I shows contrast change and existence of defects when the temperature varied from 10° C. to 45° C. in accordance with the above embodiment. Table II is prepared in the same manner by the use of the device for the above reference experiment.

TABLE I

| | | | | | | | | |
|---|---|---|---|---|---|---|---|---|
| Temperature | 10 | 15 | 20 | 25 | 30 | 35 | 40 | 45 |
| Contrast | 20 | 21 | 21 | 21 | 21 | 18 | 17 | 14 |
| Defects | no | no | no | no | no | no | no | no |

TABLE II

| | | | | | | | | |
|---|---|---|---|---|---|---|---|---|
| Temperature | 10 | 15 | 20 | 25 | 30 | 35 | 40 | 45 |
| Contrast | 20 | 21 | 21 | 21 | 20 | 15 | 7 | 5 |
| Defects | no | no | no | no | no | yes | yes | yes |

Table III is provided in order to demonstrate the dependence of contrast on frequency. The voltage applied to the device was increased as the frequency increased in order to compensate energy loss due to decrease in pulse width so that highest contrast could be obtained at respective frequencies. As clearly seen from the table, it was confirmed that higher contrast could be realized at higher frequency.

TABLE III

| | | | | | | |
|---|---|---|---|---|---|---|
| Frequency | 10 | 30 | 50 | 70 | 90 | 110 |
| Voltage | 4 | 12 | 20 | 25 | 34 | 45 |
| Contrast | 10 | 16 | 21 | 23 | 27 | 31 |

A liquid crystal display was constructed in the same manner as the above preferred embodiment with the following exceptions. The polyimide film was coated on the both inside surfaces of the substrates 1 and 2 to a thickness of 150Å. Only one of the polyimide films coated on the substrates was given rubbing treatment. Disposed between the substrates is the said another ferroelectric liquid crystal having 0 apparent dielectric anisotropy at approximately 29° C. used in the above experiment for reference. In this case, a cooling device was provided on the rare substrate of the liquid crystal display for maintaining the temperature of the liquid crystal below a certain suitable temperature.

The liquid crystal display provided with the cooling device was placed in an incubator whose inside was adjusted at 50° C. The contrast ratio of the display was measured to be 22 when the temperature of the liquid crystal was maintained at 20° C. by the operation of the cooling device. The contrast ratio of the display, however, was decreased as low as 4 when the cooling device was turned off so that the temperature of the liquid crystal was elevated to 50° C. Next, the liquid crystal display was subjected to a thermal shock test by cyclically changing the temperature of the inside of the incubator between 10° C. and 50° C. with the temperature of the liquid crystal maintained at 20° C. by the cooling device. After the temperature cycle was repeated for 100 times, the alignment of liquid crystal molecules was observed by a microscope. As a result, no zigzags were confirmed so that very high contrast image could be displayed.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, although the above example is made in the case of liquid crystal displays, the present invention can be applied for other type of optical devices such as optical projectors through which optical images can be projected to a screen.

What is claimed is:

1. A method of driving a liquid crystal device having at least a smectic liquid crystal layer provided between a pair of substrates, said method comprising the step of applying to said smectic liquid crystal layer an alternating electric field, wherein the frequency of said alternating electric field is increased in response to an increase in temperature of said liquid crystal layer in order that said smectic liquid crystal layer has a negative dielectric anisotropy with an absolute value not lower than 0.2 to orient said smectic liquid crystal layer perpendicularly to said substrates in order to prevent orientation defects from being generated in said smectic liquid crystal layer wherein said frequency is not less than 30 KHz , and the coefficient of viscosity of the liquid crystal is between 1000–4950 cps.

2. A method of driving an electro-optical device having at least a smectic liquid crystal layer provided between a pair of substrates, said method comprising:

applying to said smectic liquid crystal layer an alternating electric field; and controlling frequency of said alternating electric field at not less than 30 KHz from a first frequency to a second frequency in response to a temperature change from a first temperature to a second temperature in order that said smectic liquid crystal layer has a negative dielectric anisotropy with an absolute value not lower than 0.2 to orient said smectic liquid crystal layer perpendicularly to said substrates in order to prevent orientation defects from being generated in said smectic liquid crystal layer, wherein the ratio of (a) said second frequency minus said first frequency to (b) said second temperature minus said first temperature is positive , and the coefficient of viscosity of the liquid crystal is between 1000–4950 cps.

3. A method of driving a liquid crystal device having at least a smectic liquid crystal layer provided between a pair of substrates, said method comprising the step of applying to said smectic liquid crystal layer an alternating electric field at a frequency of not less than 30 KHz in order that said smectic liquid crystal layer has a negative dielectric anisotropy with an absolute value not lower than 0.2 to orient said smectic liquid crystal layer perpendicularly to said substrates in order to prevent orientation defects from being generated in said smectic liquid crystal layer wherein the coefficient of viscosity of the liquid crystal is between 1000–4950 cps.

* * * * *